(12) United States Patent
Pan et al.

(10) Patent No.: US 12,671,339 B2
(45) Date of Patent: Jun. 30, 2026

(54) ISOLATED DC POWER SUPPLY BASED ON CLASS-E INVERTER AND ITS DESIGN METHOD

(71) Applicant: CHONGQING UNIVERSITY, Chongqing (CN)

(72) Inventors: Jianyu Pan, Chongqing (CN); Sheng Yan, Chongqing (CN); Hong Lei, Chongqing (CN)

( * ) Notice: Subject to any disclaimer, the term of this patent is extended or adjusted under 35 U.S.C. 154(b) by 198 days.

(21) Appl. No.: 18/663,129

(22) Filed: May 14, 2024

(65) Prior Publication Data

US 2025/0070677 A1     Feb. 27, 2025

(30) Foreign Application Priority Data

Aug. 22, 2023    (CN) .......................... 202311059345.X

(51) Int. Cl.
*H02M 3/335* (2006.01)
(52) U.S. Cl.
CPC .............................. *H02M 3/33523* (2013.01)
(58) Field of Classification Search
CPC .......... H02M 7/42; H02M 7/48; H02M 7/487; H02M 7/501; H02M 7/4826; H02M 7/497; H02M 7/49; H02M 7/4807; H02M 7/537; H02M 7/5387; H02M 7/53; H02M 7/533; H02M 7/53871
See application file for complete search history.

(56) References Cited

U.S. PATENT DOCUMENTS

2024/0048185 A1 * 2/2024 He .......................... H04B 5/79

* cited by examiner

*Primary Examiner* — Bryan R Perez

(57) ABSTRACT

The invention relates to an isolated DC power supply utilizing a Class-E inverter and its design method, within the field of power electronics and high voltage technology. This DC power supply comprises a DC power source, a Class-E inverter, a CL network, a series resonant unit, and a rectifier circuit, featuring two structures. It is characterized by a single switching device and a stable output voltage that does not vary with load changes. This resolves stability issues commonly associated with isolated DC power supplies based on Class-E inverters. The invention also introduces a design method that includes calculating core parameters like capacitors and inductors, ensuring optimal component selection. Offering strong isolation, constant voltage output, high efficiency, and cost-effectiveness, this DC power supply is ideal for use in wireless power transfer systems, high-frequency power supplies, and isolated sensor and gate driver power supplies.

8 Claims, 2 Drawing Sheets

Structure I

Structure II

Step1: Determine initial parameters

The initial parameters should be determined $(V_{in}, V_o, P_{max}, \omega, M, L_T, L_R)$

Step2: Identify value of $L_r$

Depending on the different structure, calculate $L_r$ according to Formula (6) or (7)

Step3: Design values of $C_r, C_T, C_R$

Calculate $C_r, C_T, C_R$ according to Formula (8), (9), (10)

Step4: Design the value of $L_e$

$L_e$ is determined by $P_{max}$

Step5: Determine the value of $C_0$

$C_0$ is determined by $\omega$ and $L_e$

FIG. 2

ISOLATED DC POWER SUPPLY BASED ON CLASS-E INVERTER AND ITS DESIGN METHOD

TECHNICAL FIELD

The present invention belongs to the field of power electronics and high voltage technology, and specifically to an isolated DC power supply based on Class-E inverter and its design method.

BACKGROUND ART

The DC power supply structure and design method with low cost, high efficiency, and high-power density are indispensable in scenarios such as wireless power transfer systems, high-frequency AC or DC power supply, isolated sensor, or gate driver power supply. However, the traditional technical scheme using full-bridge inverters or half-bridge inverters increases the cost and volume due to the use of too many switching devices, which is not conducive to the construction of a high-performance isolated DC power supply. The Class-E inverter based isolated DC power supply uses only one switching device, which has the advantages of high frequency and soft-switching, and has good potential for high efficiency and high-power density.

However, the conventional Class-E inverter based isolated DC power supply can only work stably under a single condition, and there are problems of large inductor value/volume and extremely sensitive to load variation. When the load or output power changes, the original stable transmission state will be broken, resulting in over-current, over-voltage, or even burn-out faults of devices, which will eventually make it difficult for Class-E inverters to be applied in high-frequency and high-efficiency DC power supplies. Therefore, there is an urgent need to optimize the design of Class-E inverter based isolated DC power supply.

SUMMARY

In view of this, the objective of the present invention is to provide an isolated DC power supply based on Class-E inverter and its design method. The present invention aims to solve the problems of single condition and poor stability of Class-E inverter based isolated DC power supply.

In order to achieve the above objective, the present invention provides an isolated DC power supply based on Class-E inverter, including a DC power supply, a Class-E inverter, a CL network, a series resonant unit, and a rectifier circuit, and it has two structures.

The Class-E inverter includes an input inductor $L_e$, a power switching device S, and a parallel capacitor $C_0$;
the CL network includes a network inductor $L_r$ and a network capacitor $C_r$;
the series resonant unit includes a transmitting inductor $L_T$, a transmitting capacitor $C_T$, a transmitting inductor parasitic resistance $R_1$, a receiving inductor $L_R$, a receiving capacitor $C_R$, a receiving inductor parasitic resistance $R_2$, and M is a mutual inductor between the transmitting inductor $L_T$ and the receiving inductor $L_R$;
the rectifier circuit includes a rectifier circuit and a filter capacitor $C_{out}$, and the rectifier circuit can rectify the high-frequency AC to the DC required by the load;
the two structures include:
Structure I: an input port of the Class-E inverter is connected to the DC power supply, an output port of the Class-E inverter is connected to an input port of the CL network, an output port of the CL network is connected to an input port of the series resonant unit, an output port of the series resonant unit is connected to an input port of the rectifier circuit, an output port of the rectifier circuit is connected to a load;
Structure II: an input port of the Class-E inverter is connected to the DC power supply, an output port of the Class-E inverter is connected to an input port of the series resonant unit, an output port of the series resonant unit is connected to an input port of the CL network, an output port of the CL network is connected to an input port of the rectifier circuit, an output port of the rectifier circuit is connected to a load.

Further, the value of the input inductor $L_e$ is 1 nH-500 μH.

Further, the Class-E inverter can invert the DC into the high-frequency AC with constant voltage output, and its transformation ratio can be calculated by Formula (1):

$$\frac{V_E}{V_{in}} = 1.124 \tag{1}$$

where $V_{in}$ is a voltage of an input DC power supply, and $V_E$ is an effective value of an output high-frequency AC.

Further, depending on the different structure, the CL network or the series resonant unit can convert the high-frequency AC with a constant voltage output of the Class-E inverter into a constant current output, and transformation ratio of Structure I can be calculated by Formula (2), transformation ratio of Structure II can be calculated by Formula (3):

$$\frac{I_{cc}}{V_E} = \frac{1}{\omega L_r} \tag{2}$$

$$\frac{I_{cc}}{V_E} = \frac{1}{\omega M} \tag{3}$$

where $I_{cc}$ is an effective value of a high-frequency output current, $\omega$ is an operating angular frequency.

Further, depending on the different structure, series resonant unit or the CL network can convert the constant current input into a constant voltage output, and transformation ratio of Structure I can be calculated by Formula (4), transformation ratio of Structure II can be calculated by Formula (5):

$$\frac{V_{cv}}{I_{cc}} = \omega M \tag{4}$$

$$\frac{V_{cv}}{I_{cc}} = \omega L_r \tag{5}$$

where $V_{cv}$ is an effective value of an output constant voltage.

Further, depending on the different structure, voltage transformation ratio of Structure I can be calculated by Formula (6), voltage transformation ratio of Structure II can be calculated by Formula (7):

$$\frac{V_{out}}{V_{in}} = 1.35 \frac{M}{L_r} \tag{6}$$

-continued $$\frac{V_{out}}{V_{in}} = 1.35\frac{L_r}{M} \tag{7}$$

where $V_{out}$ is an output DC voltage on the load.

Further, the rectifier circuit is composed of two or four diodes;

Further, the diode is a SiC diode/a Si diode/a Schottky diode.

Further, the structure of the transmitting inductor $L_T$ and the receiving inductor $L_R$ is a wireless power transfer coil or a high-frequency magnetic core transformer.

The present invention also provides a design method of isolated DC power supply based on Class-E inverter, including the following steps:

S1. designing the values of input voltage $V_{in}$, output voltage $V_{out}$, maximum power $P_{max}$, and system operating angular frequency $\omega$ as required; determining the value of a self-inductor and the mutual inductor of a transmitting port and a receiving port according to a physical structure of a selected transmission medium;

S2. depending on the different structure, determining values of the network inductor $L_r$ according to Formula (6) or Formula (7);

S3. determining values of the network capacitor $C_r$, the receiving capacitor $C_R$, and the transmitting capacitor $C_r$ according to the system operating angular frequency $\omega$, and the calculation expression is as follows:

$$C_r = \frac{1}{\omega^2 L_r} \tag{8}$$

$$C_R = \frac{1}{\omega^2 L_R} \tag{9}$$

$$C_T = \frac{1}{\omega^2 L_T} \tag{10}$$

S4. determining the input inductor $L_e$ according to the maximum output power $P_{max}$ of the system, and the calculation expression is as follows:

$$L_e = 1.33\frac{V_{in}^2}{\omega P_{max}} \tag{11}$$

S5. determining values of the parallel capacitor $C_0$ according to the system operating angular frequency $\omega$, the input inductor $L_e$, and the calculation expression is as follows:

$$C_0 = \frac{1}{(1.292\omega)^2 L_e} \tag{12}$$

The beneficial effects of the present invention are:

1) the isolated DC power supply based on Class-E inverter provided by the present invention uses the Class-E inverter to invert the DC power supply to the high-frequency AC power supply output, compared with the conventional Class-E inverter, the present invention makes the output of the Class-E inverter independent of the load through parameter design, so that the DC converter has a constant voltage output;

2) the isolated DC power supply based on Class-E inverter provided by the present invention can adopt the wireless power transfer coil or the high-frequency magnetic core transformer according to different use scenarios;

3) the isolated DC power supply based on Class-E inverter provided by the present invention adopts a Class-E inverter, uses fewer switching devices, and has lower cost and smaller volume in comparison;

4) the isolated DC power supply based on Class-E inverter provided by the present invention has strong working stability, and has advantages of high frequency, high efficiency and high-power density.

Additional advantages, objectives, and features of the present invention will be set forth in part in the description that follows and in part will become apparent to those having ordinary skill in the art upon examination of the following or may be learned from practice of the present invention. The objectives and other advantages of the present invention may be realized and attained by the following description.

BRIEF DESCRIPTION OF THE DRAWINGS

FIG. 2 is a flow chart of a parameter design method of the isolated DC power supply based on a Class-E inverter according to the present invention.

DETAILED DESCRIPTION OF THE EMBODIMENTS

Figure 1:
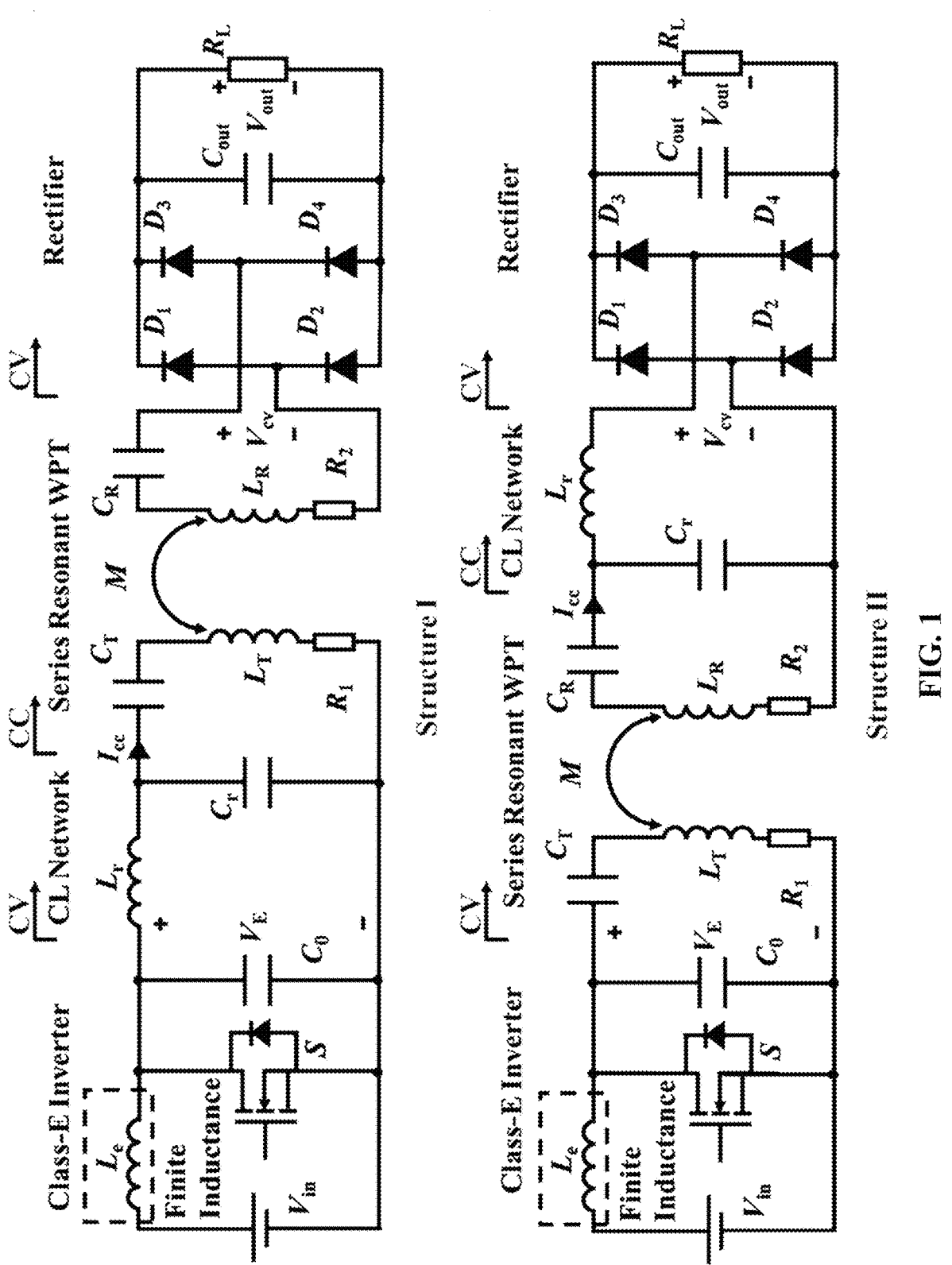
FIG. 1 is a schematic diagram of a circuit configuration of the isolated DC power supply based on a Class-E inverter according to the present invention, which has two structures.

In order to make the objectives, the technical solutions, and the advantages of the present disclosure clearer, the following clearly and completely describes the technical solutions in embodiments of the present disclosure with reference to the embodiments in combination with the drawings of the present disclosure. Apparently, the described embodiments are only some but not all of the embodiments of the present disclosure. All other embodiments obtained by those of ordinary skill in the art based on the embodiments of the present disclosure without involving any creative effort shall fall within the scope of protection of the present disclosure.

The present invention will be further elaborated hereafter in conjunction with accompanying drawings and embodiments.

As shown in FIG. 1, the present invention provides an isolated DC power supply based on Class-E inverter, including a DC power supply, a Class-E inverter, a CL network, a series resonant unit, and a rectifier circuit, and it has two structures;

The Class-E inverter includes an input inductor $L_e$, a power switching device S, and a parallel capacitor $C_0$. Wherein, the value of $L_e$ can be selected but not limited to 1 nH-100 μH, the value of $L_e$ is 0.95 μH in this embodiment case, the value of $C_0$ can be selected but not limited to 10 pF-100 μF, the value of $C_0$ is 15.97 nF in this embodiment case, the switching S can be selected a SiC device or a GaN device, and the switching device is GaN devices in this embodiment case.

The CL network includes a network inductor $L_r$ and a network capacitor $C_r$. Wherein, the values of $L_r$ can be selected but not limited to 1 nH-1 mH, the value of $L_r$ is 1.67

μH in this embodiment, and the value of $C_r$ can be selected but not limited to 10 pF-10 μF, the value of $C_r$ is 15.50 nF in this embodiment, The series resonant unit includes a transmitting inductor $L_T$, a transmitting capacitor $C_T$, a transmitting inductor parasitic resistance $R_1$, a receiving inductor $L_R$, a receiving capacitor $C_R$, a receiving inductor parasitic resistance $R_2$, and M is a mutual inductor between the transmitting inductor $L_T$ and the receiving inductor $L_R$. Wherein, the values of $L_T$ and $L_R$ can be selected but not limited to 1 nH-1 mH, the value of $L_T$ is 4.80 μH in this embodiment and the value of $L_R$ is 4.80 μH in this embodiment, the values of M can be selected but not limited to 10 nH-1 mH, the value of M is 1.70 μH in this embodiment, the value of $C_T$ can be selected but not limited to 10 pF-10 μF, the value of $C_T$ is 5.5 nF in this embodiment, the value of $C_R$ can be selected but not limited to 10 pF-10 μF, the value of $C_R$ is 5.5 nF in this embodiment, the values of $R_1$ and $R_2$ can be selected but not limited to 0.01Ω-10Ω, the values of $R_1$ and $R_2$ are 0.45Ω in this embodiment.

The rectifier circuit includes a rectifier circuit and a filter capacitor $C_{out}$, wherein, the rectifier circuit is composed of two or four diodes, the rectifier diode can choose SiC diode, Si diode, or Schottky diode, four rectifier diodes $D_1$-$D_4$ are Schottky diodes in this embodiment; the value of filter capacitor $C_{out}$ can be selected but not limited to 10 pF-10 mF, the value of $C_{out}$ is 30 μF in this embodiment, and the rectifier circuit can rectify the high-frequency AC to the DC required by the load $R_L$.

According to the above parameters, two kinds of structures can be formed as shown in FIG. 1, the two structures include:

Structure I: an input port of the Class-E inverter is connected to the DC power supply, an output port of the Class-E inverter is connected to an input port of the CL network, an output port of the CL network is connected to an input port of the series resonant unit, an output port of the series resonant unit is connected to an input port of the rectifier circuit, an output port of the rectifier circuit is connected to a load;

Structure II: an input port of the Class-E inverter is connected to the DC power supply, an output port of the Class-E inverter is connected to an input port of the series resonant unit, an output port of the series resonant unit is connected to an input port of the CL network, an output port of the CL network is connected to an input port of the rectifier circuit, an output port of the rectifier circuit is connected to a load.

The Class-E inverter can invert the DC into the high-frequency AC with constant voltage output, and its transformation ratio can be calculated by Formula (1):

$$\frac{V_E}{V_{in}} = 1.124 \tag{1}$$

where $V_{in}$ is a voltage of an input DC power supply, and $V_E$ is an effective value of an output high-frequency AC.

Depending on the different structure, the CL network or the series resonant unit can convert the high-frequency AC with a constant voltage output of the Class-E inverter into a constant current output, and transformation ratio of Structure I can be calculated by Formula (2), transformation ratio of Structure II can be calculated by Formula (3):

$$\frac{I_{cc}}{V_E} = \frac{1}{\omega L_r} \tag{2}$$

$$\frac{I_{cc}}{V_E} = \frac{1}{\omega M} \tag{3}$$

where $I_{cc}$ is an effective value of a high-frequency output current, $\omega$ is an operating angular frequency.

Depending on the different structure, series resonant unit or the CL network can convert the constant current input into a constant voltage output, and transformation ratio of Structure I can be calculated by Formula (4), transformation ratio of Structure II can be calculated by Formula (5):

$$\frac{V_{cv}}{I_{cc}} = \omega M \tag{4}$$

$$\frac{V_{cv}}{I_{cc}} = \omega L_r \tag{5}$$

where $V_{cv}$ is an effective value of an output constant voltage.

The isolated DC power supply based on Class-E inverter can obtain a voltage transformation ratio that can be selected but not limited to 0.1-50 by adjusting the size of $L_r$ and M, the output voltage $V_{out}$ does not change with the load $R_L$, the voltage transformation ratio is 1.35 in this embodiment, the input voltage $V_{in}$ can be selected but not limited to 0.1V-10 kV, the value of $V_{in}$ is 10V in this embodiment, the output voltage $V_{out}$ can be selected but not limited to 0.1V-10 kV, the value of $V_{out}$ is 13.5V in this embodiment, and the maximum power $P_{max}$ can be selected but not limited to 1 W-10 kW, the value of $P_{max}$ is 8 W in this embodiment, the system operating angular frequency $\omega$ can be selected but not limited to 2π×100 kHz-2π×10 MHz, and the value of $\omega$ is 2π×1 MHz in this embodiment.

The isolated DC power supply based on Class-E inverter, depending on the different structure, voltage transformation ratio of Structure I can be calculated by Formula (6), voltage transformation ratio of Structure II can be calculated by Formula (7):

$$\frac{V_{out}}{V_{in}} = 1.35 \frac{M}{L_r} \tag{6}$$

$$\frac{V_{out}}{V_{in}} = 1.35 \frac{L_r}{M} \tag{7}$$

where $V_{out}$ is an output DC voltage on the load.

As shown in FIG. 2, the present invention also provides a design method of isolated DC power supply based on Class-E inverter, including the following steps:

S1. the values of input voltage $V_{in}$, output voltage $V_{out}$, maximum power $P_{max}$, and system operating angular frequency $\omega$ are designed as required; the value of a self-inductor and the mutual inductor of a transmitting port and a receiving port are determined according to a physical structure of a selected transmission medium;

S2. depending on the different structure, determining value of the network inductor $L_r$ according to Formula (6) or Formula (7);

S3. determining values of the network capacitor $C_r$, the receiving capacitor $C_R$, and the transmitting capacitor $C_T$ according to the system operating angular frequency $\omega$, and the calculation expression is as follows:

$$C_r = \frac{1}{\omega^2 L_r} \tag{8}$$

$$C_R = \frac{1}{\omega^2 L_R} \tag{9}$$

$$C_T = \frac{1}{\omega^2 L_T} \tag{10}$$

S4. determining the input inductor $L_e$ according to the maximum output power $P_{max}$ of the system, and the calculation expression is as follows:

$$L_e = 1.33 \frac{V_{in}^2}{\omega P_{max}} \tag{11}$$

S5. determining values of the parallel capacitor $C_0$ according to the system operating angular frequency $\omega$, and the input inductor $L_e$ and the calculation expression is as follows:

$$C_0 = \frac{1}{(1.292\omega)^2 L_e} \tag{10}$$

In summary, the isolated DC power supply based on Class-E inverter proposed in this invention has the advantages of constant voltage output not affected by load $R_L$ change, high isolation voltage, high efficiency and low cost, and it has value of popularization and application in the field of power electronics and high voltage technology.

Finally, it should be noted that the above examples are merely used for describing the technical solutions of the present invention, rather than limiting the same. Although the present invention has been described in detail with reference to the preferred examples, those of ordinary skill in the art should understand that the technical solutions of the present invention may still be modified or equivalently replaced. However, these modifications or substitutions should not make the modified technical solutions deviate from the spirit and scope of the technical solutions of the present invention.

What is claimed is:

1. A design method of an isolated DC power supply based on Class-E inverter, wherein, the isolated DC power supply based on Class-E inverter comprises: a DC power supply, a Class-E inverter, a CL network, a series resonant unit, and a rectifier circuit;

the Class-E inverter comprises: an input inductor ($L_e$), a power switching device (S), and a parallel capacitor ($C_0$);

the CL network comprises: a network inductor ($L_r$) and a network capacitor ($C_r$);

the series resonant unit comprises: a transmitting inductor ($L_T$), a transmitting capacitor ($C_T$), a transmitting inductor parasitic resistance ($R_1$), a receiving inductor ($L_R$), a receiving capacitor ($C_R$), and a receiving inductor parasitic resistance ($R_2$), and M is a mutual inductor between the transmitting inductor ($L_T$) and the receiving inductor ($L_R$);

the rectifier circuit comprises: a rectifier circuit and a filter capacitor ($C_{out}$), and the rectifier circuit rectifies a high-frequency AC to a DC required by a load;

and wherein the isolated DC power supply is constructed by any one of two types of connections: Type I or Type II:

in the Type I, an input port of the Class-E inverter is connected to the DC power supply, an output port of the Class-E inverter is connected to an input port of the CL network, an output port of the CL network is connected to an input port of the series resonant unit, an output port of the series resonant unit is connected to an input port of the rectifier circuit, an output port of the rectifier circuit is connected to a load;

in the Type II, the input port of the Class-E inverter is connected to the DC power supply, the output port of the Class-E inverter is connected to the input port of the series resonant unit, the output port of the series resonant unit is connected to the input port of the CL network, the output port of the CL network is connected to the input port of the rectifier circuit, the output port of the rectifier circuit is connected to the load;

wherein the design method comprising:

S1. designing values of input voltage ($V_{in}$), output voltage ($V_{out}$), maximum power ($P_{max}$), and system operating angular frequency ($\omega$) as required; determining a value of a self-inductor and a mutual inductor of a transmitting port and a receiving port according to a physical structure of a selected transmission medium;

S2. depending on the Type I or the Type II, determining a voltage transformation ratio of the network inductor ($L_r$) according to Formula (6) or Formula (7):

$$\frac{V_{out}}{V_{in}} = 1.35 \frac{M}{L_r}, \tag{6}$$

$$\frac{V_{out}}{V_{in}} = 1.35 \frac{L_r}{M}; \tag{7}$$

S3. determining values of the network capacitor ($C_r$), the receiving capacitor ($C_R$), and the transmitting capacitor ($C_r$) according to the system operating angular frequency ($\omega$), and calculation expressions are as follows:

$$C_r = \frac{1}{\omega^2 L_r}, \tag{8}$$

$$C_R = \frac{1}{\omega^2 L_R}, \tag{9}$$

$$C_T = \frac{1}{\omega^2 L_T}; \tag{10}$$

S4. determining the input inductor ($L_e$) according to the maximum power ($P_{max}$) of a system, and a calculation expression is as follows:

$$L_e = 1.33 \frac{V_{in}^2}{\omega P_{max}}; \tag{11}$$

S5. determining values of the parallel capacitor ($C_0$) according to the system operating angular frequency ($\omega$), and the input inductor ($L_e$), and a calculation expression is as follows:

$$C_0 = \frac{1}{(1.292\omega)^2 L_e}. \tag{12}$$

2. The design method according to claim 1, wherein a value of the input inductor ($L_e$) is 1 nH-500 µH.

3. The design method according to claim 1, wherein the Class-E inverter inverts the DC into the high-frequency AC with constant voltage output, and a transformation ratio of an inverting process is calculated by Formula (1):

$$\frac{V_E}{V_{in}} = 1.124; \tag{1}$$

wherein $V_{in}$ is a voltage of an input DC power supply, and $V_E$ is an effective value of an output high-frequency AC.

4. The design method according to claim 1, wherein the CL network or the series resonant unit converts the high-frequency AC with a constant voltage output of the Class-E inverter into a constant current output, and a transformation ratio of the Type I is calculated by Formula (2), and a transformation ratio of the Type II is calculated by Formula (3):

$$\frac{I_{cc}}{V_E} = \frac{1}{\omega L_r}, \tag{2}$$

-continued $$\frac{I_{cc}}{V_E} = \frac{1}{\omega M}; \tag{3}$$

wherein $I_{cc}$ is an effective value of a high-frequency output current, and $\omega$ is an operating angular frequency.

5. The design method according to claim 1, wherein the series resonant unit or the CL network converts a constant current input into a constant voltage output, and a transformation ratio of the Type I is calculated by Formula (4), and a transformation ratio of the Type II is calculated by Formula (5):

$$\frac{V_{cv}}{I_{cc}} = \omega M, \tag{4}$$

$$\frac{V_{cv}}{I_{cc}} = \omega L_r; \tag{5}$$

wherein $V_{cv}$ is an effective value of an output constant voltage.

6. The design method according to claim 1, wherein the rectifier circuit is composed of two or four diodes.

7. The design method according to claim 6, wherein any one of the two or four diodes is selected from a SIC diode, a Si diode, and a Schottky diode.

8. The design method according to claim 1, wherein a structure of the transmitting inductor ($L_T$) and the receiving inductor ($L_R$) is a wireless power transfer coil or a high-frequency magnetic core transformer.

* * * * *